(12) United States Patent
Swaminathan et al.

(10) Patent No.: US 9,554,239 B2
(45) Date of Patent: Jan. 24, 2017

(54) OPPORTUNISTIC OFFLOADING OF TASKS BETWEEN NEARBY COMPUTING DEVICES

(71) Applicant: Apple Inc., Cupertino, CA (US)

(72) Inventors: Arvind Swaminathan, San Jose, CA (US); Anandamoy Sen, Cupertino, CA (US); Ahmet Ferhat Yildirim, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/692,654

(22) Filed: Apr. 21, 2015

(65) Prior Publication Data

US 2016/0316314 A1 Oct. 27, 2016

(51) Int. Cl.
*H04B 5/00* (2006.01)
*H04W 4/00* (2009.01)
*H04L 29/08* (2006.01)
*H04W 36/00* (2009.01)

(52) U.S. Cl.
CPC .............. *H04W 4/008* (2013.01); *H04L 67/34* (2013.01)

(58) Field of Classification Search
CPC ...... H04L 67/34; H04L 67/2866; H04W 4/008
USPC ...................... 455/41.1, 41.2, 437
See application file for complete search history.

(56) References Cited

U.S. PATENT DOCUMENTS

| 5,142,684 | A | 8/1992 | Perry et al. |
| 7,519,047 | B1 | 4/2009 | Macaulay et al. |
| 8,938,222 | B2 | 1/2015 | Morohoshi |
| 9,282,516 | B2 | 3/2016 | Sen et al. |
| 2005/0175003 | A1 | 8/2005 | Craft et al. |
| 2007/0005946 | A1 | 1/2007 | Zimmer et al. |
| 2007/0011272 | A1 | 1/2007 | Bakke et al. |
| 2009/0089794 | A1 | 4/2009 | Hilton |
| 2010/0088387 | A1* | 4/2010 | Calamera ............ H04L 12/587 709/207 |
| 2012/0079018 | A1 | 3/2012 | Rottler et al. |

(Continued)

FOREIGN PATENT DOCUMENTS

| WO | WO2015103048 | 7/2015 |
| WO | 2015120625 A1 | 8/2016 |

OTHER PUBLICATIONS

Derek R. Kumar, System and Method for Selective Timer Rate Limiting, U.S. Appl. No. 13/895,264 dated May 15, 2013.

(Continued)

*Primary Examiner* — Ayodeji Ayotunde
(74) *Attorney, Agent, or Firm* — Downey Brand LLP

(57) ABSTRACT

The embodiments set forth a technique for enabling a group of computing devices to delegate tasks in a manner that promotes energy savings. According to one embodiment, each computing device is configured to identify situations where the computing device has an energy advantage (e.g., when plugged-in) and should serve as a proxy computing device to other computing devices. Each computing device is also configured to identify situations where the computing device has an energy disadvantage (e.g., a low battery) and should seek out another computing device to act as a proxy computing device. In this manner, computing devices can delegate tasks between one another to reduce or eliminate the processing redundancies that otherwise occur when the computing devices work in isolation to maintain network connectivity and carry out tasks on their own.

35 Claims, 11 Drawing Sheets

(56) References Cited

U.S. PATENT DOCUMENTS

| | | | |
|---|---|---|---|
| 2012/0109952 A1* | 5/2012 | Reddy | H04L 67/1095 |
| | | | 707/736 |
| 2013/0109323 A1 | 5/2013 | Ruutu et al. | |
| 2013/0109371 A1 | 5/2013 | Brogan et al. | |
| 2013/0190032 A1 | 7/2013 | Li | |
| 2013/0331118 A1 | 12/2013 | Chhabra et al. | |
| 2014/0082214 A1* | 3/2014 | Agarwal | H04L 67/06 |
| | | | 709/240 |
| 2014/0086125 A1 | 3/2014 | Polo et al. | |
| 2014/0134990 A1 | 5/2014 | Chou | |
| 2014/0154986 A1 | 6/2014 | Lee et al. | |
| 2014/0179233 A1 | 6/2014 | Kang et al. | |
| 2014/0237123 A1 | 8/2014 | Dave et al. | |
| 2014/0240122 A1 | 8/2014 | Roberts et al. | |
| 2015/0187187 A1 | 7/2015 | Del Toro et al. | |
| 2015/0187339 A1 | 7/2015 | Vaz Waddington | |

OTHER PUBLICATIONS

"Prevention of multiple notifications across multiple devices"—An IP.com Prior Art Database Technical Disclosure No. IPCOM000241329D, electronic publication dated Apr. 17, 2015.

PCT International Search Report, PCT Application No. PCT/US2016/024092 date Aug. 1, 2016 (5 pages).

PCT International Written Opinion PCT Application No. PCT/US2016/024092 date Aug. 1, 2016 (7 pages).

\* cited by examiner

OPPORTUNISTIC OFFLOADING OF TASKS BETWEEN NEARBY COMPUTING DEVICES

FIELD

The described embodiments set forth a technique for opportunistically offloading tasks between nearby computing devices.

BACKGROUND

Recent years have shown a proliferation in the number of individuals who operate computing devices (e.g., smartphones, tablets, laptops, etc.). Typically, users migrate to various locations throughout the day, and, as a result, clusters of computing devices tend to continually form and disintegrate. A cluster can include, for example, two or more computing devices that share a common user account, two or more computing devices that share similar hardware features, and the like. In general, a cluster can form when at least two computing devices are communicatively coupled to one another via a Personal Area Network (PAN) (e.g., via a Bluetooth® connection, a direct WiFi connection, a Near Field Communication (NFC) connection, etc.). These local networks are typically formed when the computing devices transmit (i) identifying information that enables the computing devices to establish a particular level of trust, and (ii) connection information, which together enable the computing devices to form a communicative coupling. In turn, the computing devices can implement useful functionality, e.g., performing direct file swaps between one another.

Despite the foregoing connectivity techniques, computing devices continue to work in isolation when carrying out various tasks that are involved with providing internet-category connectivity (e.g., push notifications, Voice over Internet Protocol (VoIP) phone calls, geolocation updates, and the like). Notably, a considerable amount of energy is consumed when carrying out these tasks, as application processors and radios within the computing devices need to continually wake in order to transmit, receive, and process data. This is unfortunate considering that, in many cases, there exists an overlap between data that is processed by two or more computing devices within a cluster, yet the computing devices continue to process the overlapped data in an isolated and redundant manner.

SUMMARY

The embodiments set forth a technique for enabling a group of computing devices to delegate tasks in a manner that promotes energy savings. According to one embodiment, each computing device is configured to identify situations where the computing device has an energy advantage (e.g., when plugged-in) and should serve as a proxy computing device to other (i.e., secondary) computing devices. Each computing device is also configured to identify situations where the computing device has an energy disadvantage (e.g., a low battery) and should seek out another computing device to act as a proxy computing device. In this manner, computing devices can delegate tasks between one another to reduce or eliminate the processing redundancies that otherwise occur when the computing devices work in isolation to maintain network connectivity and carry out tasks on their own.

One embodiment sets forth a method for enabling a computing device to receive push notifications via a proxy computing device instead of a notification server. Specifically, the method is implemented at the computing device, and includes the steps of: (1) identifying a condition in which to seek out the proxy computing device through which to receive push notifications, (2) issuing, to nearby computing devices, a request for one of the nearby computing devices to serve as the proxy computing device, (3) receiving, from at least one of the nearby computing devices, an offer to serve as the proxy computing device, and (4) in response to receiving the offer: updating a configuration at the computing device to cause the computing device to receive push notifications from the proxy computing device instead of the notification server.

Another embodiment sets forth a method for enabling a computing device to serve as a proxy computing device to at least one nearby computing device. Specifically, the method is implemented at the computing device, and includes the steps of: (1) receiving, from the at least one nearby computing device, a request for the computing device to serve as the proxy computing device, (2) identifying a condition in which the computing device is eligible to serve as the proxy computing device to the at least one nearby computing device, (3) in response to identifying the condition, issuing, to the at least one nearby computing device, an offer to serve as the proxy computing device, and (4) updating, at the computing device, a configuration to cause the computing device to: (i) receive, from a notification server, specific push notifications associated with the at least one nearby computing device, and (ii) route the specific push notifications to the at least one nearby computing device.

Yet another embodiment sets forth a system configured to enable a computing device to serve as a proxy computing device to at least one nearby computing device. Specifically, the system includes at least two computing devices, and a notification server, where the notification server is configured to carry out steps that include: (1) receiving, from a first computing device of the at least two computing devices, an indication that the first computing device is serving as a proxy computing device to a second computing device of the at least two computing devices, and (2) updating a configuration to cause specific push notifications directed toward (i) the first computing device, or (ii) the second computing device, to be delivered to the first computing device.

Other embodiments include a non-transitory computer readable medium configured to store instructions that, when executed by a processor, cause the processor to implement any of the foregoing steps.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Other aspects and advantages of the embodiments described herein will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing wireless computing devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Figure 1:
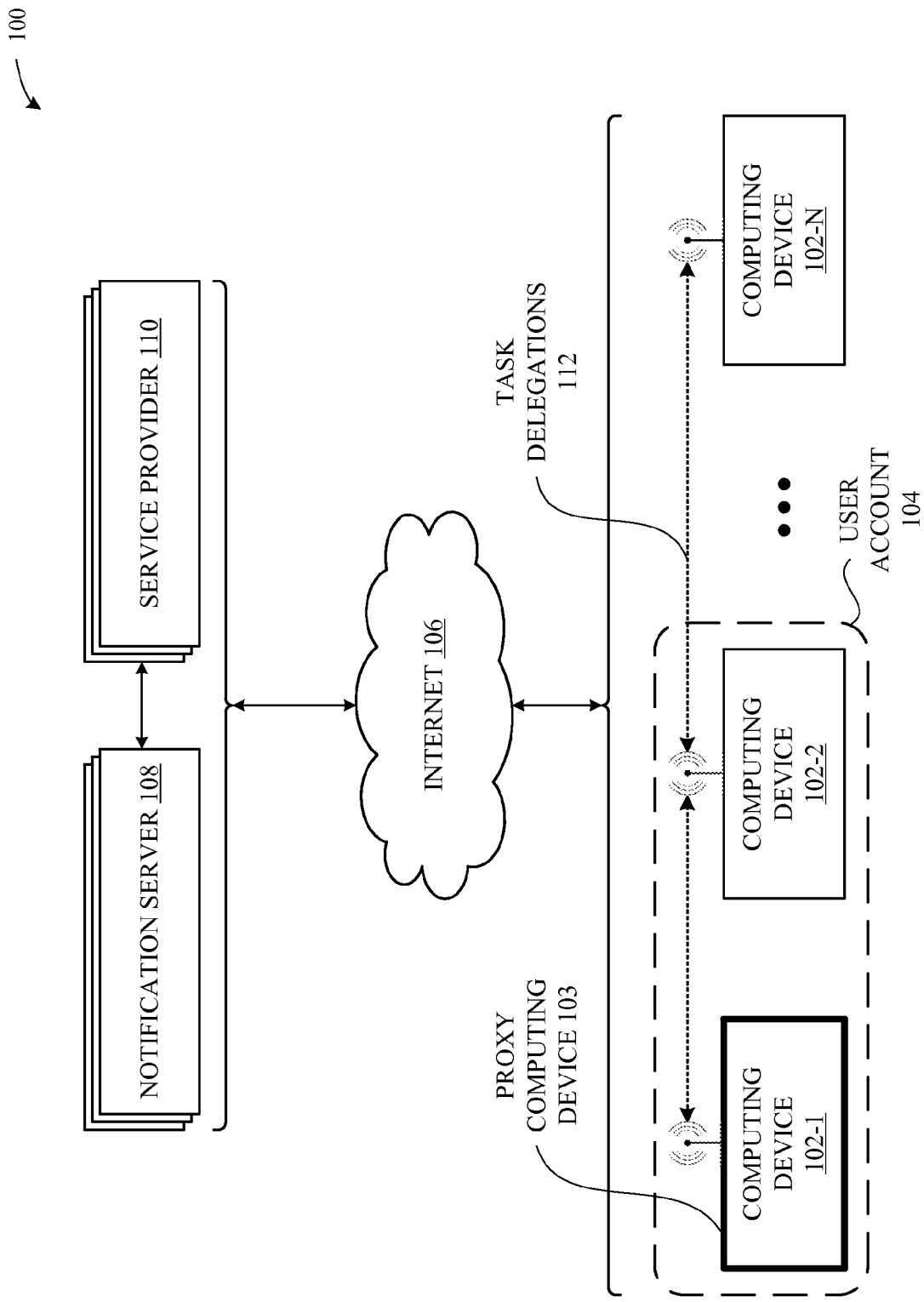
FIG. 1 illustrates a block diagram of different components of a system configured to implement the various techniques described herein, according to some embodiments.

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

A typical computing device—such as a smartphone device or a tablet device—includes a variety of hardware components that enable the computing device to provide an abundance of features that are beneficial to its user. The hardware components can include, for example, wireless hardware that enables the computing device to transmit and receive data via cellular base stations and/or WiFi access points. In more recent times, typical users possess two or more computing devices (e.g., a smartphone device and a tablet device), where each of the two or more computing devices are configured with a common user account (e.g., a cloud services account). Notably, when a user account is shared between two or more computing devices, a considerable overlap can occur with respect to certain types of data—e.g., email messages, instant messages, push notifications, and the like—that are received and processed by the two or more computing devices. As a result, precious energy resources are consumed at each of the two or more computing devices, which degrades user satisfaction. Accordingly, there exists a need to reduce or eliminate such overlaps in processing.

Representative embodiments set forth herein disclose techniques for enabling a group of computing devices—specifically, a group of computing devices capable of establishing a Personal Area Network (PAN) between one another—to delegate tasks in a manner that promotes energy savings. Such tasks can include, for example, receiving push notifications on behalf of another computing device (and forwarding the push notifications), processing push notifications on behalf of another computing device to produce a result (and forwarding the result), processing email fetch tasks on behalf of another computing device, handling background activities on behalf of another computing device, establishing a peer-to-peer (P2P) socket through which information can be transmitted, and the like. According to one embodiment, each computing device is configured to implement a set of preferences/rules that enables the computing device to identify situations where the computing device should serve as a proxy computing device to secondary computing devices. This can involve, for example, the computing device offering to serve as a proxy computing device when the computing device (i) is plugged into a charger, and (ii) has a strong internet connection. The set of rules can also enable the computing device to identify situations where the computing device should seek out another computing device to act as a proxy computing device. This can involve, for example, the computing device seeking out a proxy computing device when the computing device (i) is not plugged into a charger, and (ii) has low battery power. Further considerations can involve analyzing a quality of internet connectivity available to the computing device, analyzing activity levels of components included in the computing device (e.g., processor utilization, wireless component utilization, etc.), analyzing geolocation-based information (e.g., whether the computing device was previously able to establish a beneficial proxy computing device/secondary computing device implementation), determining whether a user account associated with the computing device is associated with at least one other computing device, and the like. In this manner, computing devices can delegate tasks between one another to reduce or eliminate the processing redundancies that otherwise occur when the computing devices work in isolation to maintain network connectivity and carry out tasks on their own.

Accordingly, the foregoing approaches provide techniques for reducing or eliminating redundant processing of data by configuring computing devices to utilize PANs established through lower-energy communication protocols (e.g., BTLE, direct WiFi, NFC, etc.). A more detailed discussion of these techniques is set forth below and described in conjunction with FIGS. 1-5, 6A, 6B, 6C, and 7-9, which illustrate detailed diagrams of systems and methods that can be used to implement these techniques.

FIG. 1 illustrates a block diagram of different components of a system 100 that is configured to implement the various techniques described herein, according to some embodiments. More specifically, FIG. 1 illustrates a high-level overview of the system 100, which, as shown, includes various computing devices 102 that are configured to interface with one another via PANs through which task delegations 112 can be communicated. A variety of communication protocols can be used to transmit the task delegations 112, including Bluetooth® Low Energy (BTLE), WiFi direct, NFC, and the like. It is noted, however, that the computing devices 102 described herein are not constrained to only utilizing low energy protocols to communicate between one another. As illustrated in FIG. 1, each of the computing devices 102 can be configured to communicate with one another over any number of "hops," i.e., the information can be passed between different computing devices 102—including computing devices 102 that do not necessarily intend to participate in task delegations 112, but nonetheless pass on task delegations 112 to surrounding computing devices 102. The manner in which the task delegations 112 are communicated over hops can be regulated in any matter, e.g., limiting task delegations 112 to a particular number of hops, limiting the task delegations 112 to a total transmission time, and the like, which can help prevent situations where energy is inefficiently and unnecessarily drained from middle-man computing devices 102.

Although not illustrated in FIG. 1, a task delegation 112 can include a payload that is used to transport information that enables the computing devices 102 to establish local connectivity between one another and to delegate tasks. According to one embodiment, the payload can take the form of a data object whose structure is known to or can be deduced by computing devices 102 in order to process the data included within the payload. For example, the payload can include information that represents a user account (e.g., the user account 104 of FIG. 1) associated with the computing device 102 that transmits the payload, as well as network information for establishing a local connection. In turn, another computing device 102 that receives the payload can identify whether a common user account is shared, and, in accordance with preferences/rules associated with the computing device 102, can establish a local connection with the computing device 102 or disregard the payload entirely.

According to some embodiments, and to provide a particular level of security, a computing device 102 can be configured to implement the techniques described herein only when the computing device 102 and at least one other computing device 102 are associated with the same user account. This can prevent, for example, the computing device 102 from establishing communication channels with other nearby computing devices 102 that do not share a common owner, which can be desirable for individuals who prefer their communications to not pass through a proxy of any kind. Moreover, to increase efficiency, when a user account is associated with only a single computing device 102 (and no other computing devices 102), the single computing device 102 can be prevented from attempting to identify any other computing devices 102 that are associated with the same user account, which would otherwise unnecessarily consume energy resources.

As described in greater detail herein, each computing device 102 can be configured to periodically query nearby computing devices 102 in order to establish relationships that enable various tasks to be offloaded to other computing devices 102—specifically, other computing devices 102 with higher energy resources—in order to promote energy savings at the computing device 102. For example, a computing device 102 with a low battery can be configured to query nearby computing devices 102 to identify or establish a proxy computing device—illustrated as a proxy computing device 103 in FIG. 1—onto which tasks can be delegated. Alternatively, a computing device 102 without energy concerns (e.g., a plugged-in device) can be configured to broadcast availability to nearby computing devices to serve as a proxy computing device 103 that is willing to take on task delegations 112 issued by the nearby computing devices.

As also shown in FIG. 1, the computing devices 102 can be configured to interface with notification servers 108 and service providers 110 via an internet connection 106. According to one embodiment, the notification servers 108 are configured to implement a push notification service that functions to deliver push notifications to the computing devices 102. This can include, for example, the notification servers 108 interfacing directly with the service providers 110 to identify when push notifications should be sent to the computing devices 102. In turn, the computing devices 102 receive and process the push notifications, which often results in the computing devices 102 interfacing directly with the service providers 110. This can occur, for example, when a push notification merely indicates that new data is available for retrieval via a service provider 110, and the push notification itself does not include the new data.

As described in greater detail herein, the computing devices 102 can be configured to inform the notification servers 108 when a proxy computing device 103 is selected. In this manner, the notification servers 108 can configure themselves to (i) identify push notifications directed toward the computing devices 102 (or the proxy computing device 103 itself), and (ii) route the push notifications to the selected proxy computing device 103. In turn, the selected proxy computing device 103 can respectively route the push notifications to the appropriate computing devices 102. According to some embodiments, a computing device 102, when assigned to function as the proxy computing device 103, can be configured to inform the notification servers 108 of the assignment on behalf of the other computing devices 102. This can beneficially enable the other computing devices 102 to further achieve power savings as the computing devices 102 are not required to individually inform the notification servers 108 of the proxy computing device 103 assignment. Additionally, and according to some embodiments, one or more of the computing devices 102 that interface with the proxy computing device 103 can be configured to maintain active communication channels with the notification servers 108 despite being configured to offload tasks to the proxy computing device 103. Notably, these active communication channels can function to serve as backup communication channels that can be efficiently switched to in the event that the proxy computing device 103 can no longer handle tasks on behalf of the computing devices 102, thereby promoting energy savings.

Figure 2:
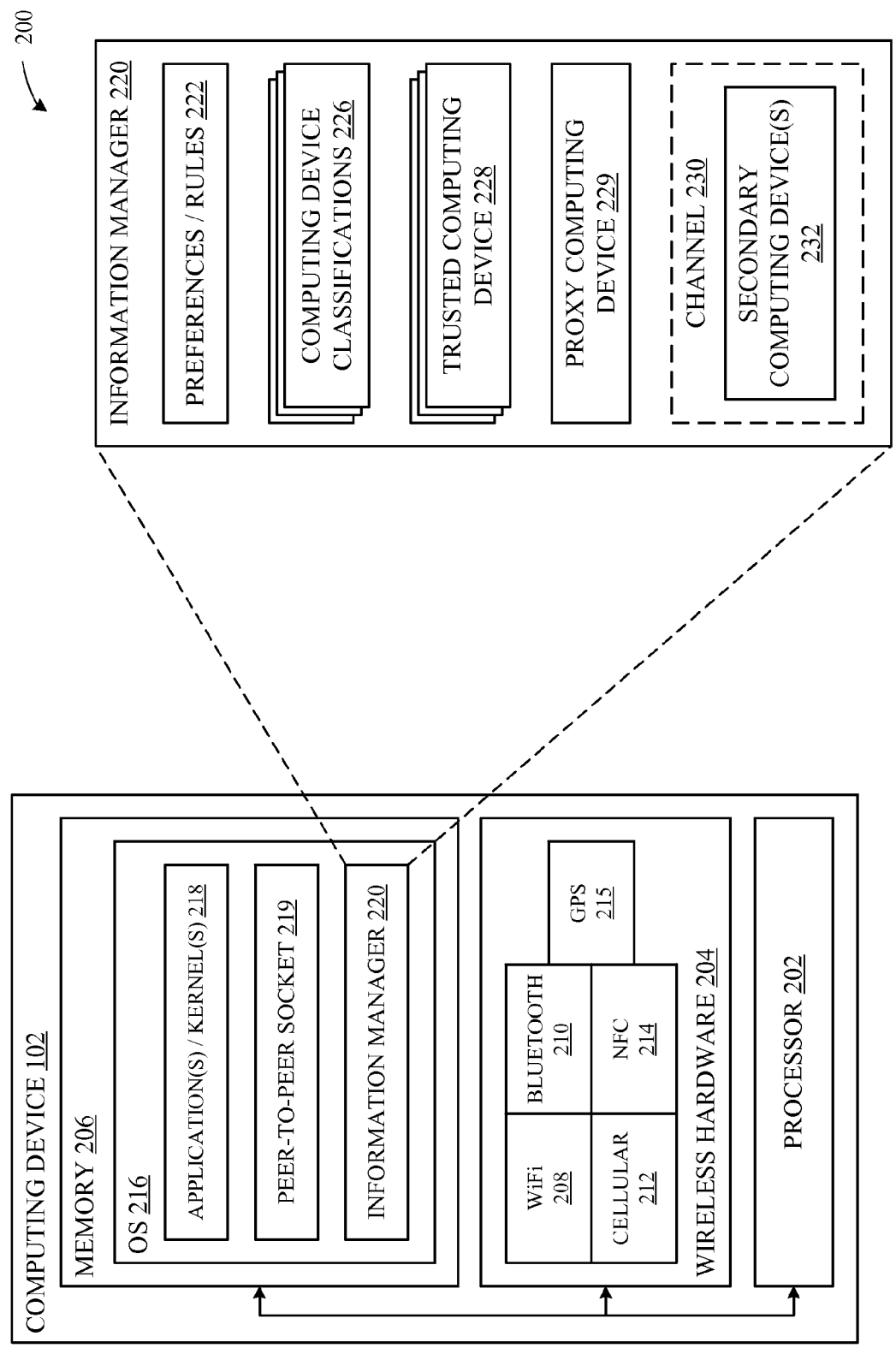
FIG. 2 illustrates a block diagram of a more detailed view of particular components of a computing device of FIG. 1, according to some embodiments.

FIG. 2 illustrates a block diagram of a more detailed view 200 of particular components of a computing device 102 of FIG. 1, according to some embodiments. As shown in FIG. 2, the computing device 102 can include a processor 202, wireless hardware components 204, and a memory 206. The wireless hardware components 204 can include, but are not limited to, a WiFi component 208, a Bluetooth® component 210, a cellular component 212, an NFC component 214, and a Global Positioning System (GPS) component 215. As also shown in FIG. 2, the processor 202, in conjunction with the memory 206, can execute an operating system (OS 216) that includes a variety of applications/kernels 218 for managing the various hardware components included in the computing device 102. The OS 216 can also implement a peer-to-peer socket 219, which, as described in greater detail herein, enables the computing device 102 to enable other nearby computing devices 102 to access, via low-energy protocols, an internet connection that is maintained by the computing device 102 (e.g., through the cellular component 212 or the WiFi component 208). Although not illustrated in FIG. 2, the computing device can further include an Ethernet component that enables the computing device 102 to access the internet via a wired connection.

As also illustrated in FIG. 2, the OS 216 of the computing device 102 can further be configured to implement an information manager 220. The information manager 220 can include preferences/rules 222, a list of computing device classifications 226, and a list of trusted computing devices 228, a proxy computing device indication 229 of a proxy computing device 103 (when the computing device 102 on which the information manager 220 is executing is subscribed to the proxy computing device 103), and a channel 230 (when the computing device 102 on which the information manager 220 is executing serves as a proxy computing device 103 to one or more computing devices 102).

According to some embodiments, at least one of the wireless hardware components 204 can be configured to implement at least some of the functionality normally provided by the processor 202, thereby reducing the overall amount of processor 202 uptime and establishing the potential to save energy. More specifically, and as described in greater detail below, the information manager 220 can be configured to offload, e.g., to the WiFi component 208, the Bluetooth® component 210, the cellular component 212, the NFC component 214, etc., a subset of tasks that are normally handled by the processor 202. It is noted that the processor 202 of a computing device 102 is not limited to offloading the subset of tasks to wireless hardware components 204 that are included in the same computing device 102. Instead, the techniques described herein can also involve configuring the processor 202 of a computing device 102 to offload the subset of tasks to wireless hardware components 204 that are included in one or more peer computing devices 102. More specifically, and as described in greater detail below in conjunction with FIGS. 6A-6C and 7-8, the various techniques directed toward establishing a proxy computing device can similarly be used to enable a processor 202 included in a first computing device 102 to offload tasks to one or more wireless hardware components 204 included in a second (i.e., different) computing device 102.

According to some embodiments, the tasks that are eligible for offloading from the processor 202 to at least one of the wireless hardware components 204 can include tasks that typically involve carrying out intermittent communications that cause the processor 202 to remain awake or to have to frequently wake at short intervals. Consider, for example, keepalive (KA) commands, which cause a communications channel between the computing device 102 and the notification server 108 to remain active. According to this example, offloading the KA commands from the processor 202 to, for example, the WiFi component 208, can involve updating a configuration of the computing device 102 (e.g., by way of the information manager 220) to cause the WiFi component 208 (of the computing device 102, or of a peer computing device 102, if one is available and elected) to issue the KA commands to the notification server 108 (instead of the processor 202). The tasks can also include, for example, email fetch commands that normally are periodically issued by way of the processor 202. According to this example, offloading the email fetch commands from the processor 202 to, for example, the WiFi component 208, can involve updating a configuration of the computing device 102 to cause the WiFi component 208 to issue email fetch commands (instead of the processor 202). The configuration can also cause the WiFi component 208 to activate the processor 202 (e.g., when the processor 202 is in a sleep mode) when at least one new email is available for download, whereupon the processor 202 can carry out a procedure to cause the at least one new email to be downloaded to the computing device 102. Additionally, the wireless hardware components 204—e.g., the cellular component 212—can be configured to receive push notifications on behalf of the processor 202 (e.g., when the processor 202 is in a low-power or sleep mode), and temporarily buffer any low-priority push notifications that should not immediately cause the processor 202 to wake. According to this approach, the cellular component 212 can provide the buffered low-priority push notifications at an appropriate time, e.g., when a predetermined interval has passed, when a threshold number of buffered commands is satisfied, when a high-priority push notification is received, and the like. Further examples of offload-eligible tasks can include an active chat service, Session Initiation Protocol (SIP)/Voice over Internet Protocol (VoIP) services, social media updates, periodic location updates, and the like.

According to some embodiments, the manner in which tasks are offloaded from a processor 202 to a wireless hardware component 204 can be based on one or more of the type of task to be offloaded, the kinds of wireless hardware components 204 that are available, the operating states of the wireless hardware components 204, radio link qualities available to the wireless hardware components 204, and the like. For example, when it is desirable for a computing device 102 to periodically report coarse-granularity location updates to a cloud service (e.g., for mobile device recovery services, location-aware push notifications, etc.), a configuration of the computing device 102 can be updated such that location information is obtained from the cellular component 212 (where other wireless hardware components 204 can optionally be placed into an inactive state to save energy). In another example, when it is desirable for the computing device 102 to periodically report fine-granularity location updates to a cloud service (e.g., when implementing geo-fencing services), a configuration of the computing device 102 can be updated such that location information is obtained from the cellular component 212 and the GPS component 215 (where other wireless hardware components 204 can optionally be placed into an inactive state to save energy). In another example, when it is desirable for the computing device 102 to periodically report indoor location updates to a cloud service (e.g., when implementing context-aware push notifications, retail location tracking, etc.), a configuration of the computing device 102 can be updated such that location information is obtained from the cellular component 212 and the WiFi component 208. In yet another example, when it is desirable for the computing device 102 to periodically interact with Bluetooth®-enabled devices, a configuration of the computing device can be updated such that communications tasks are offloaded to the cellular component 212 and the Bluetooth component 210. It is noted that the techniques set forth herein are not limited to the foregoing examples, and that any combination of the wireless hardware components 204 can be utilized in accordance with one or more of the type of tasks to be offloaded, the kinds of wireless hardware components 204 that are available the operation states of the wireless hardware components 204, radio link qualities available to the wireless hardware components 204, and the like.

According to one embodiment, the preferences/rules 222 dictate the manner in which the information manager 220 operates. For example, the preferences/rules 222 can specify whether the computing device 102 should seek out a proxy computing device 103 or advertise the capability to act as a proxy computing device 103. The preferences/rules 222 also can be used to enable the computing device 102 to manage its proxy computing device involvement. For example, the preferences/rules 222 can establish that, when a battery level of the computing device 102 do not satisfy a threshold level of energy, the computing device 102 should search for nearby computing devices 102 that are willing to serve as a proxy computing device 103. Other overall hardware/software capabilities of the computing device 102 can also influence these factors, e.g., processing capacity, battery drain rate, user activity levels, and the like. Moreover, the computing device 102 can be configured to identify a particular exit event upon which to cease its proxy computing device involvement, e.g., when the computing device 102 is plugged into a power adapter, or when the battery level of the computing device 102 satisfies the threshold level of energy.

The computing device classifications 226 can be used in conjunction with the preferences/rules 222 to enable the computing device 102 to establish itself as a proxy computing device 103, or to promote another computing device 102 to serve as a proxy computing device 103. According to one example, the computing device classifications 226 include the following entries: {Class 1: Desktop (stationary, connected to energy source), Class 2: Laptop (mobile, large battery capacity), Class 3: Tablet (mobile, medium battery capacity), Class 4: Smart Phone (mobile, small battery capacity), Class 5: Wearables (mobile, very small battery capacity)}. Continuing with this example, the preferences/rules 222 can be configured to implement a preference order in conjunction with the computing device classifications 226 when establishing a proxy computing device 103. For example, the preference order could enforce the following prioritization of computing devices 102: {Priority 1: Class 1, 2, 3, 4 devices when plugged-in, Priority 2: Class 2 devices on battery power and with a battery level higher than X %, Priority 3: Class 3 devices on battery power with a battery level higher than X %, Priority 4: Class 3 or 4 devices with least amount of usage based on historical data, Priority 5: Class 4 devices on battery power).

The trusted computing devices 228 can represent other computing devices 102 with which the computing device 102 regularly communicates and has proxy computing device involvement. For example, if the computing device 102 represents a user's smartphone device, the trusted computing devices 228 can include a tablet computing device and a laptop computing device that share a common user account with the user's smartphone device. This is especially useful since the tablet device and the laptop device likely have a larger battery than the smartphone device and can be designated as proxy computing devices 103 to the smartphone device when the smartphone device is nearby and can establish a low-energy PAN. Finally, a proxy computing device indication 229 can be used by the information manager 220 to indicate an established proxy computing device 103 on which the computing device 102 relies.

Figure 4:
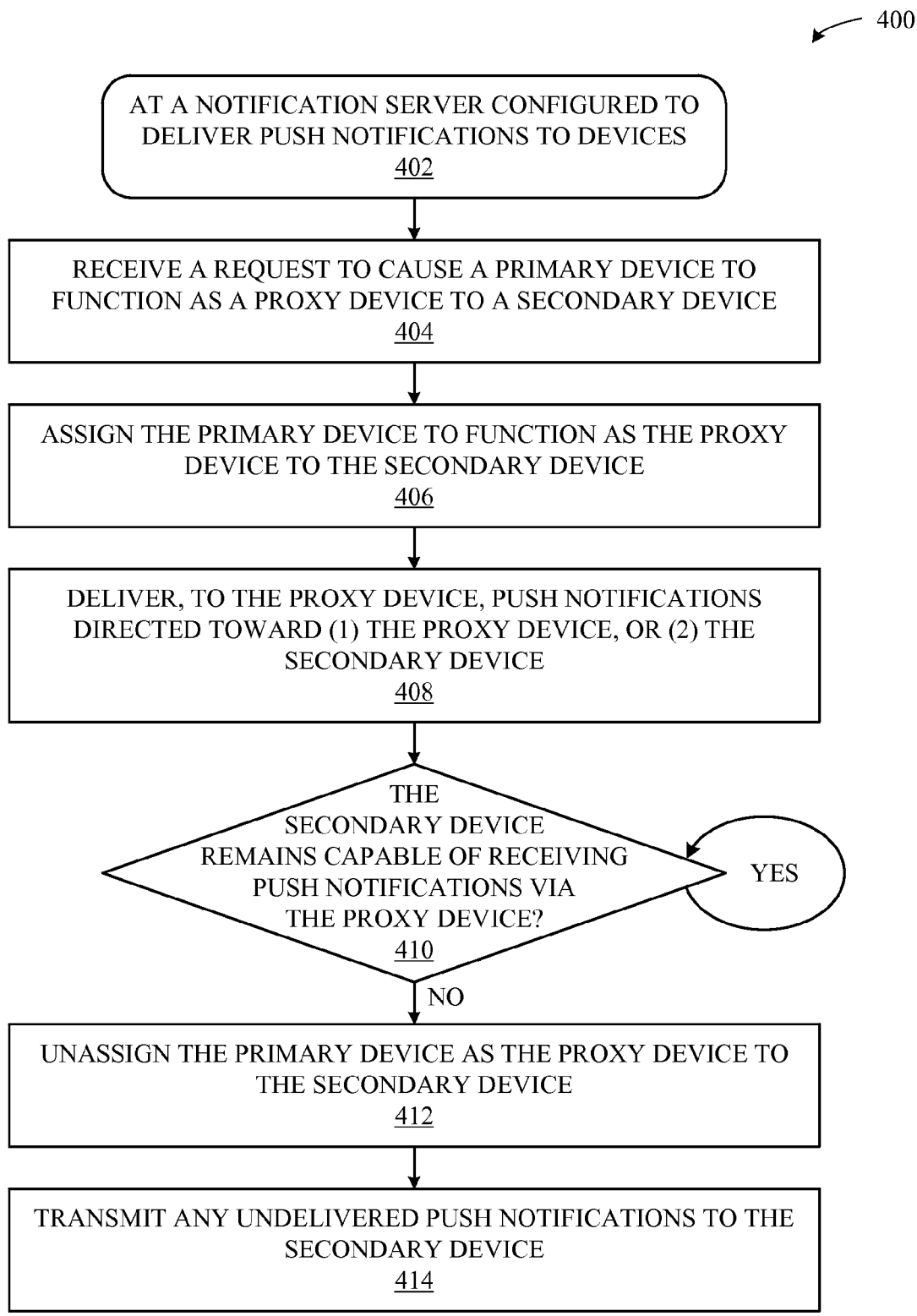
FIG. 4 illustrates a method that is carried out by a notification manager, and involves processing a request to establish a proxy computing device, according to one embodiment.

As further shown in FIG. 4, a channel 230 can be used when the computing device 102 is designated as a proxy computing device 103 to secondary computing devices 102. Specifically, when the computing device 102 is selected as the proxy computing device 103, the information manager 220 can establish a channel 230 that includes an entry 232 for each secondary computing device 102 that now relies on the computing device 102 to receive and forward push notifications. In the event that the computing device 102 no longer serves as the proxy computing device 103 to the secondary computing devices 102, the information manager 220 can simply delete the channel 230 to reflect the change. According to some embodiments, when the computing device 102 is selected as the proxy computing device 103, the information manager 220 can be configured to construct and deconstruct channels 230 on a per-communication basis. This can reduce the amount of energy consumption that otherwise occurs when channels 230 are left open and communications are seldom/or only periodically received. According to some embodiments, when a user account is common between the proxy computing device 103 and a secondary computing device 102, information associated with the user account can be used as a basis for establishing security over channels 230 (e.g., using encryption keys derived from the information) as they are constructed and deconstructed. This can reduce the amount of overhead that otherwise is involved when establishing, from scratch, various parameters (e.g., encryption keys) that are typically required for securing a channel 230.

Although not illustrated in FIG. 2, other embodiments can involve establishing different channels 230 using different communication protocols, and utilizes the different channels 230 in accordance with a variety of factors. For example, a first channel 230 can be established using cellular technology, a second channel 230 can be established using WiFi technology, and a third channel 230 can be established using Bluetooth® technology. According to this example, the proxy computing device 103—specifically, the information manager 220 executing on the proxy computing device 103—can be configured to dynamically identify an appropriate one of first, second, and third channels 230 through which different communications should be routed. This can involve, for example, (i) selecting the channel 230 based on a size, a format, a priority, etc., of a communication that needs to be routed, (ii) selecting the channel 230 based on a proximity (e.g., determined using BTLE) of the proxy computing device 103 to the second computing device 102 to which a communication is being routed, (iii) an amount of energy available (e.g., battery levels, power adapter presence, etc.) to the proxy computing device 103/the second computing device 102, (iv) activity levels of different components (e.g., processor components, wireless components, etc.) included in the proxy computing device 103/the second computing device 102, and the like.

Figure 3:
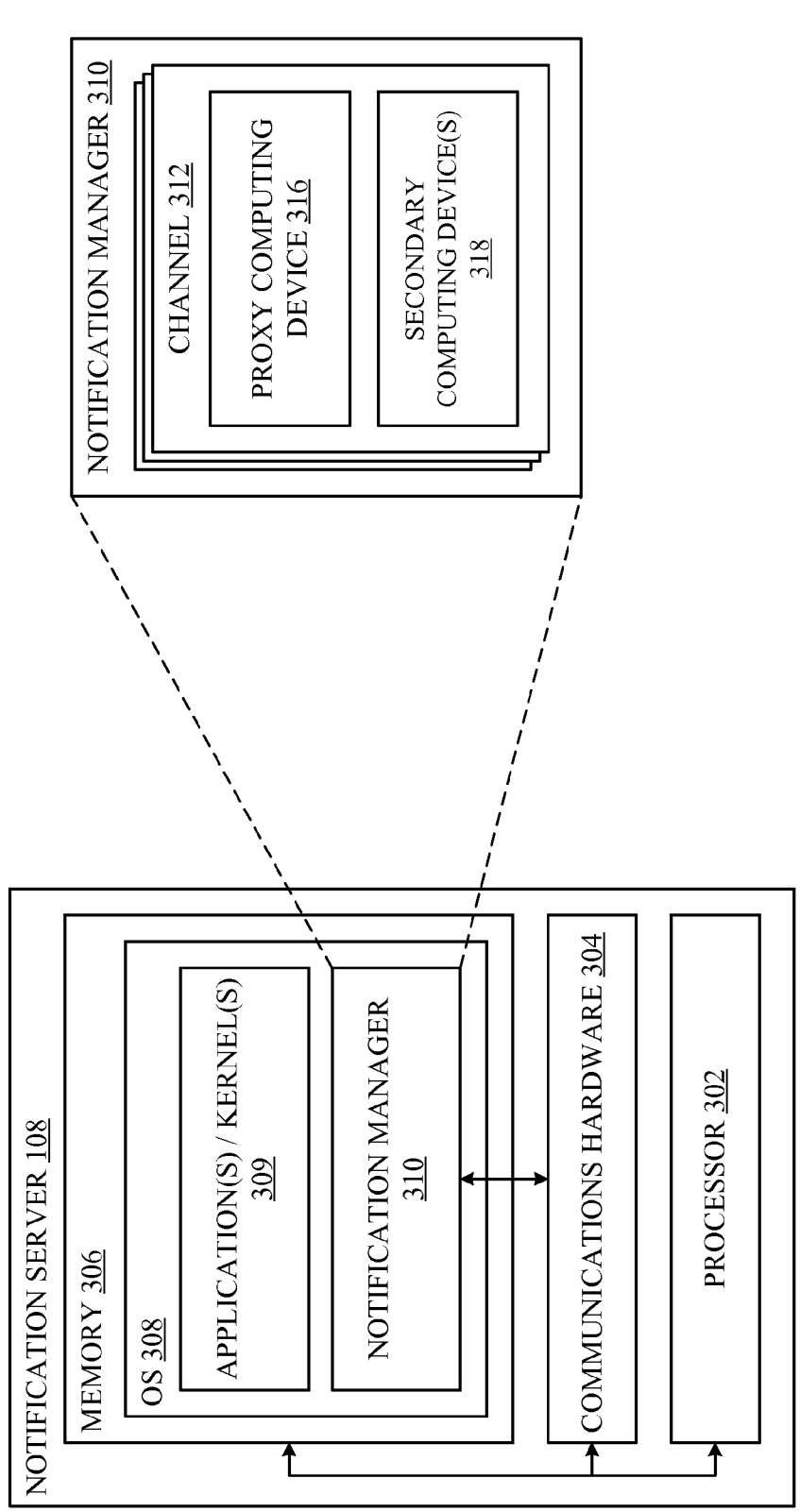
FIG. 3 illustrates a block diagram of a more detailed view of particular components of a notification server of FIG. 1, according to some embodiments.

FIG. 3 illustrates a block diagram of a more detailed view 300 of particular components of a notification server 108 of FIG. 1, according to some embodiments. As shown in FIG. 3, the notification server 108 can include a processor 302, communications hardware 304, and a memory 306. The communications hardware 304 can include, for example, an Ethernet component that enables the notification server 108 to access the internet and communicate with the computing devices 102 and service providers 110. As also shown in FIG. 3, the processor 302, in conjunction with the memory 306, can execute an operating system (OS 308) that includes a variety of applications/kernels 309 for managing the various hardware components included in the notification server 108. The OS 308 can also implement a notification manager 310, which, as described in greater detail herein, is configured to generate push notifications (in conjunction with the service providers 110) and deliver the push notifications to the computing devices 102. More specifically, the notification manager 310 can be configured to implement, for each group of computing devices 102 where a proxy computing device 103 has been selected, a channel 312. As shown in FIG. 3, each channel 312 can include an entry 316 for a selected proxy computing device 103, as well as entries 318 for secondary computing devices 102 that subscribe to the proxy computing device 103. In this manner, each push notification that is processed by the notification manager 310 can be referenced against the channels 312 to identify situations, if any, in which the specialized routing techniques described herein should be implemented.

Accordingly, FIGS. 1-3 provide an overview of architectures for the system 100, the computing device(s) 102, and the notification server(s) 108, which, as set forth above, enable the implementation of the various techniques set forth herein. FIGS. 4-5, 6A, 6B, 6C, and 7-9, which are described in detail below, set forth different techniques that enable the computing devices 102 to offload tasks between one another to promote energy savings.

FIG. 4 illustrates a method 400 that is carried out by the notification manager 310, and involves processing a request to establish a proxy computing device 103, according to one embodiment. As shown in FIG. 4, the method 400 begins at step 402, where the notification manager 310 initializes to process requests (e.g., issued by computing devices 102) to establish proxy computing devices 103. At step 404, the notification manager 310 receives a request to cause a primary computing device 102 to function as a proxy computing device 103 to a secondary computing device 102. At step 406, the notification manager 310 assigns the primary computing device 102 to function as the proxy computing device 103 to the secondary computing device 102. This can involve, for example, establishing a channel 312 within the notification manager 310, where the entry 316 of the channel 312 corresponds to the primary computing device 102, and the entry 318 of the channel 312 corresponds to the secondary computing device 102. In turn, and according to the assignment, at step 408, the notification manager 310 delivers, to the proxy computing device 103, push notifications directed toward (1) the proxy computing device 103, or (2) the secondary computing device 102.

At step 410, the notification manager 310 determines whether the secondary computing device 102 remains capable of receiving push notifications via the proxy computing device 103. This determination can involve, for example, identifying whether corresponding read receipts are received for recent push notifications that were sent to the secondary computing device 102 via the proxy computing device 103. If, at step 410, the notification manager 310 determines that the secondary computing device 102 remains capable of receiving push notifications via the proxy computing device 103, then the method 400 repeats at step 410. Otherwise, the method 400 proceeds to step 412, where the notification manager 310 unassigns the primary computing device 102 as the proxy computing device 103 to the secondary computing device 102. This can involve, for example, deleting the channel 312 that was established at step 406. At step 414, the notification manager 310 transmits any undelivered push notifications directly to the secondary computing device 102.

Figure 5:
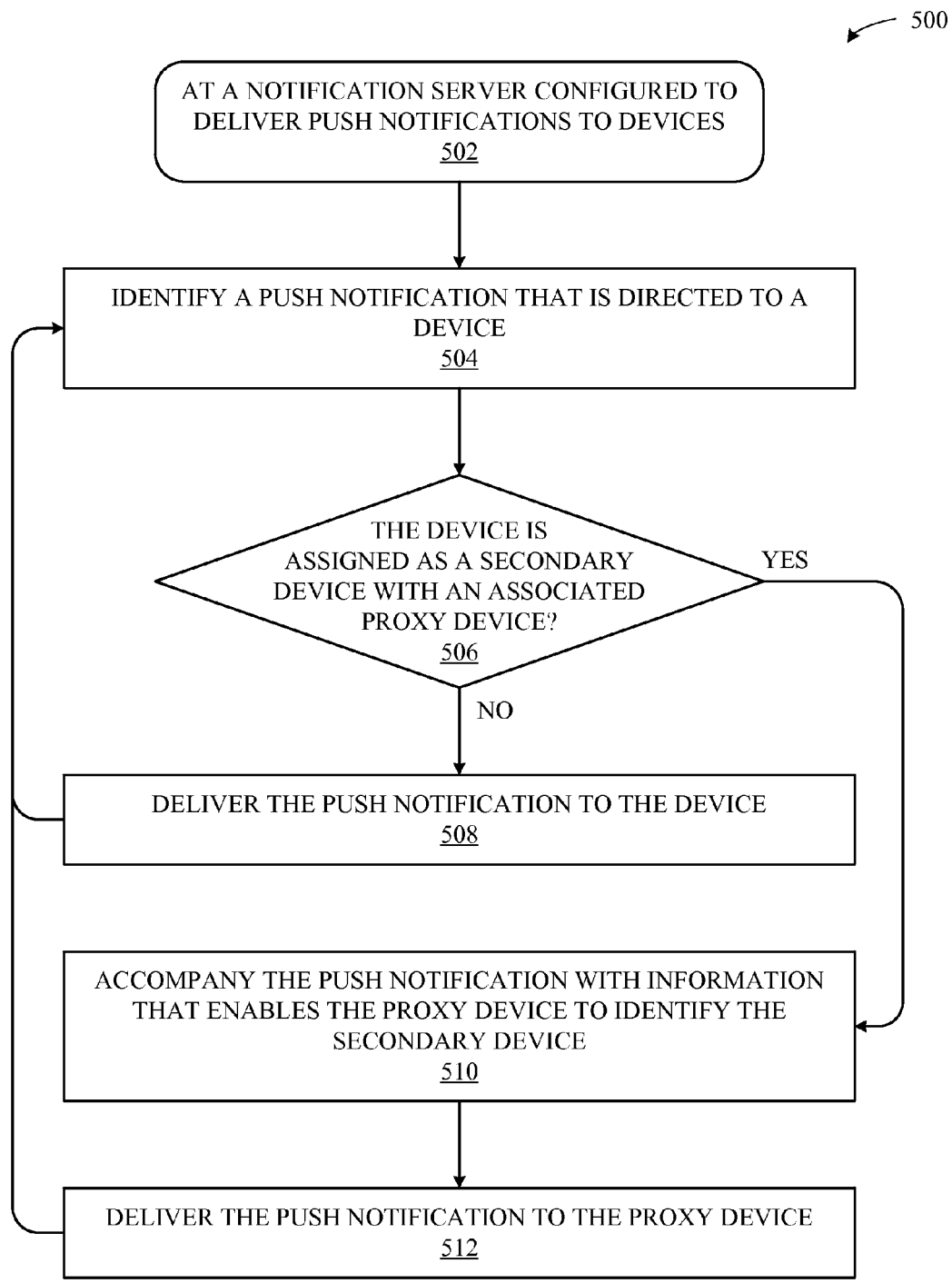
FIG. 5 illustrates a method that is carried out by a notification manager, and involves distributing push notifications in accordance with a proxy computing device that is established by way of the method illustrated in FIG. 4, according to one embodiment.

FIG. 5 illustrates a method 500 that is carried out by the notification manager 310, and involves distributing push notifications in accordance with channels 312 that are established by way of the method 400 illustrated in FIG. 4, according to one embodiment. As shown in FIG. 5, the method 500 begins at step 502, where the notification manager 310 initializes to deliver push notifications to computing devices 102. At step 504, the notification manager 310 identifies a push notification that is directed to a computing device 102. At step 506, the notification manager 310 determines whether the computing device 102 is assigned as a secondary computing device 102 with an associated proxy computing device 103. This can involve, for example, referencing channels 312 to identify any entries 318 that correspond to the computing device 102.

If, at step 506, the notification manager 310 determines that the computing device 102 is assigned as a secondary computing device 102 with an associated proxy computing device 103, then the method 500 proceeds to step 510. Otherwise, the method 500 proceeds to step 508, where the notification manager 310 delivers the push notification directly to the computing device 102.

At step 510, the notification manager 310 accompanies the push notification with information that enables the proxy computing device 103 to identify the secondary computing device 102. This can involve, for example, accompanying the push notification with a unique identifier associated with the secondary computing device 102, where the unique identifier is also known to the proxy computing device 103 and enables the proxy computing device 103 to route the push notification to the secondary computing device 102. At step 512, the notification manager 310 delivers the push notification to the proxy computing device 103.

Figure 6A:
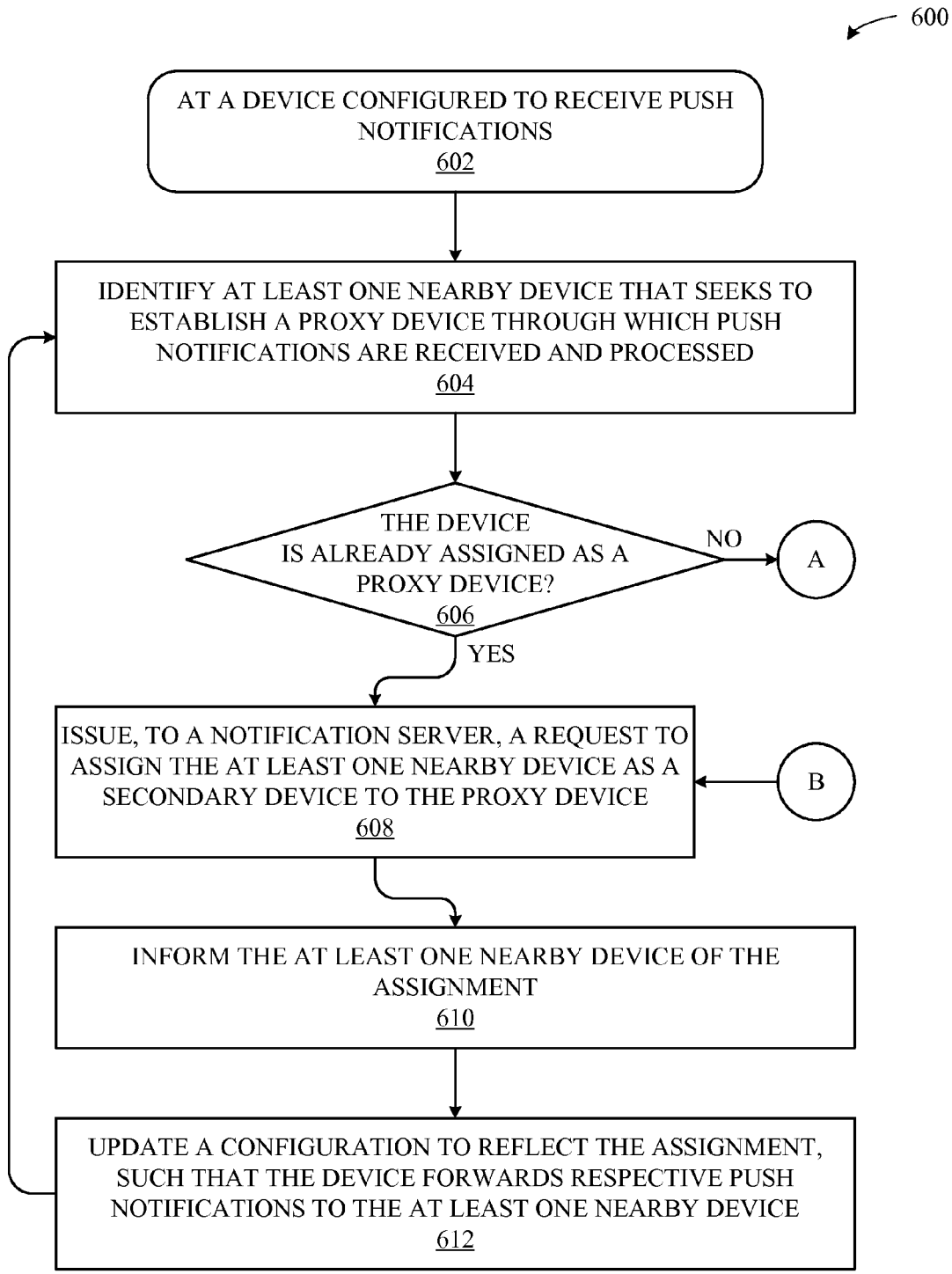
FIGS. 6A-6C illustrate a method that is carried out by information managers executing on the computing devices of FIG. 1, and enables the computing devices to establish a proxy computing device, according to one embodiment.
Figure 6B:
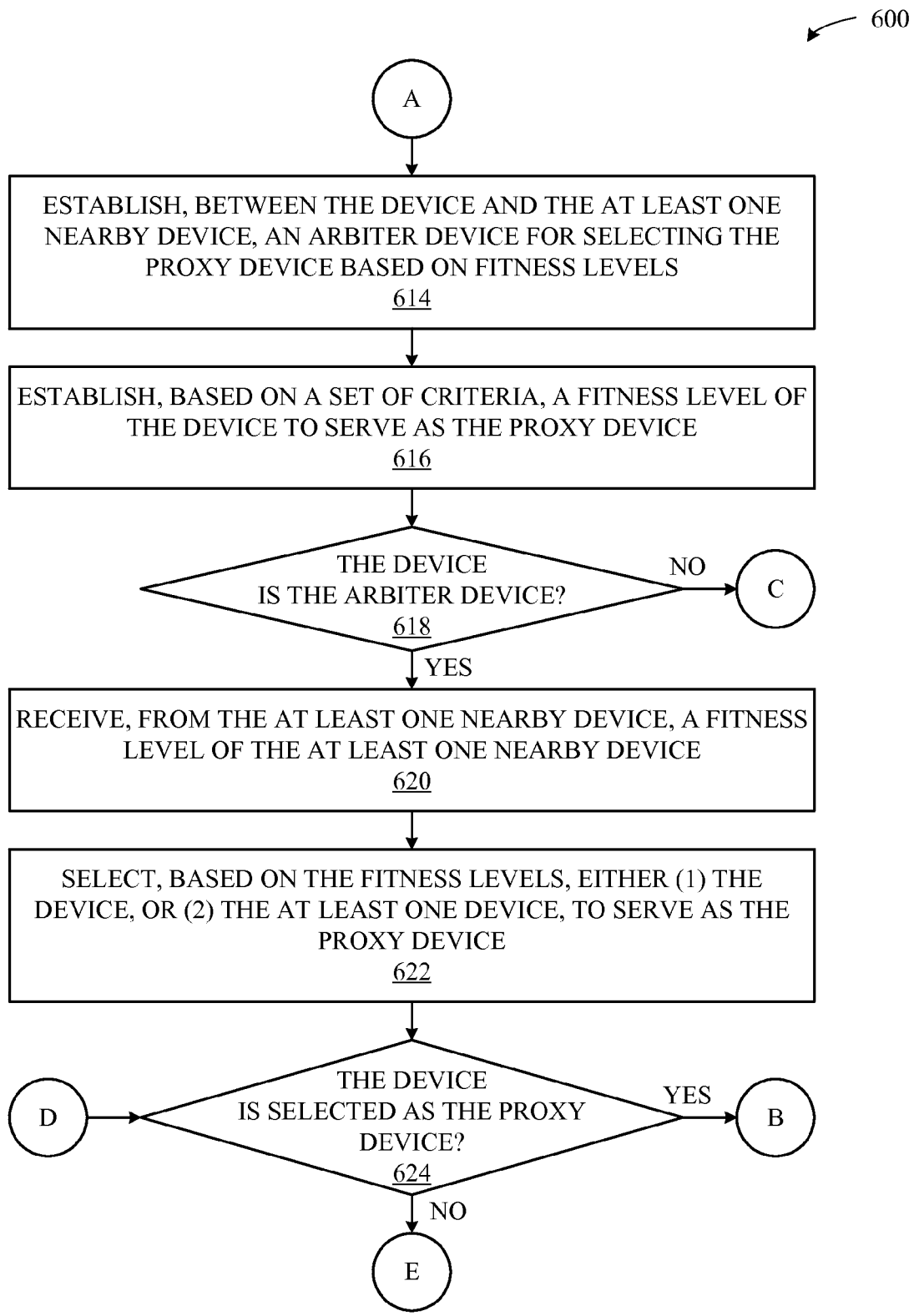
Figure 6C:
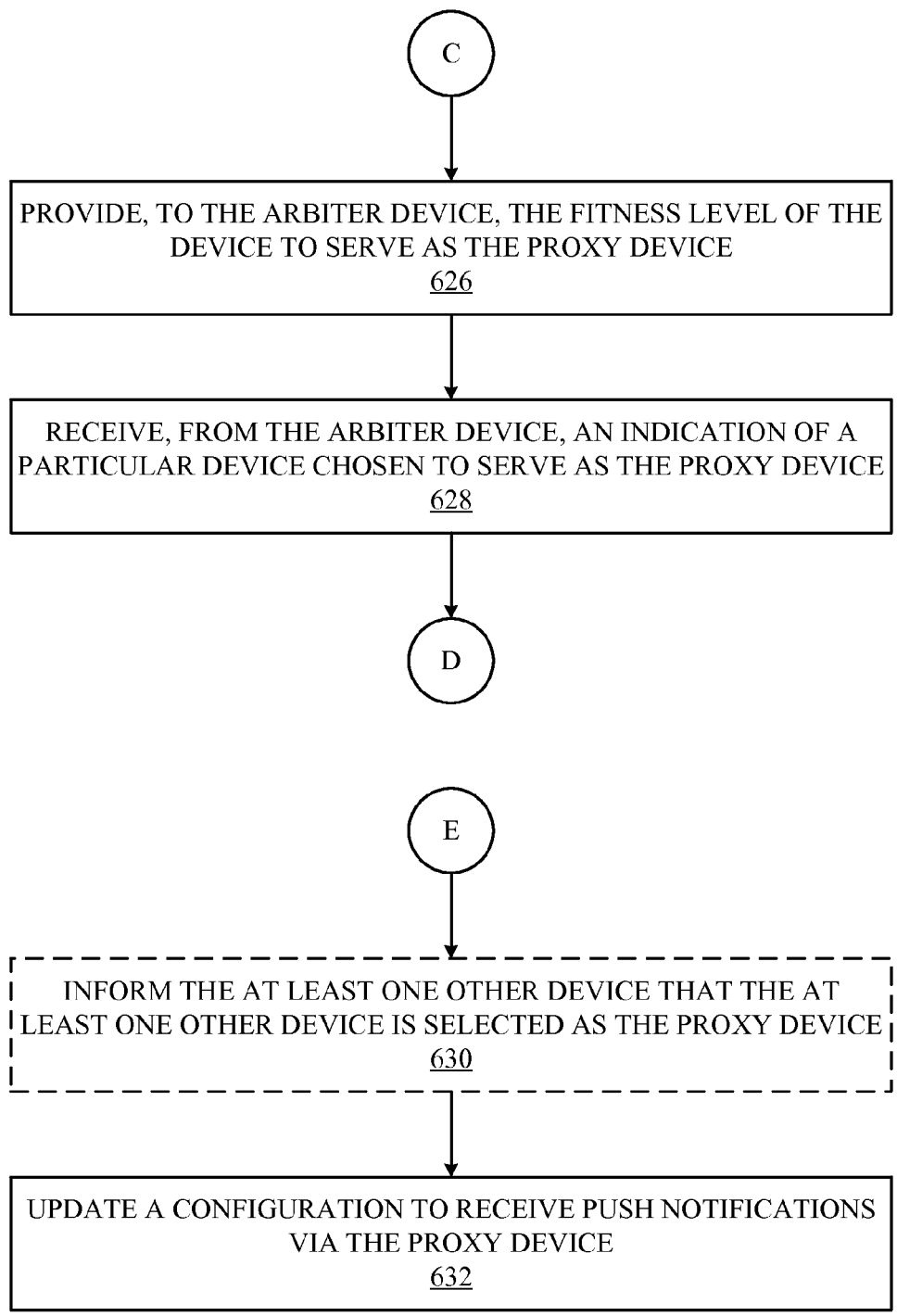

FIGS. 6A-6C illustrate a method 600 that is carried out by information managers 220 executing on computing devices 102, and enables the computing devices 102 to establish a proxy computing device 103, according to one embodiment. As shown, the method 600 begins at step 602, where an information manager 220 executing on a computing device 102 initializes to receive push notifications. At step 604, the information manager 220 identifies at least one nearby computing device 102 that seeks to establish a proxy computing device 103 through which push notifications are received and processed, or at least one nearby computing device 102 that is willing to serve as a proxy computing device 103. Step 604 can occur, for example, when a condition defined by the preferences/rules 222, computing device classifications 226, and/or trusted computing devices 228 is met. This can involve, for example, the information manager 220 determining that the computing device 102 is in an area where a cost of using the cellular component 212 or WiFi component 208 is relatively high. This can be based on, for example, a history of reception quality over an amount of time, a link quality metric, historical information based on location, link quality advertisements received (e.g., via BTLE) from neighboring computing devices 102, and the like.

Step 604 can also occur, for example, when the information manager 220 performs an analysis and determines that establishing a proxy computing device 103 will promote energy savings over the current method of connectivity being utilized by the computing device 102. This can involve, for example, estimating a range between nearby computing devices 102 to identify an amount of energy that will be required to establish an adequate communication channel 230. According to one example, the notification manager 310 can be configured to calculate energy costs associated with downloading files of various sizes for two different cases. Specifically, a first case involves calculating a "Cell Energy Cost" associated with downloading the files directly via the cellular component 212. A second case involves calculating a "Relay Energy Cost" associated with downloading the files via a low-energy connection with a proxy computing device 103. In this manner, an amount of potential radio energy savings can be calculated by performing the following equation: (Cell Energy Cost−(Relay Energy Cost+LE Cost)), where "LE Cost" represents an amount of energy that is consumed when interfacing (e.g., via the Bluetooth® component 210) with nearby computing devices 102 to establish and maintain a proxy computing device 103. Moreover, a processing energy savings can be calculated by the following equation: (2*Cell Cost−(Cell Cost+2*Relay Cost+LE Overhead). It is noted that these calculations are merely exemplary, and that the embodiments herein can implement any calculations that enable the information manager 220 to appropriately determine scenarios in which it would be beneficial to establish a proxy computing device 103.

At step 606, the information manager 220 determines whether the computing device 102 is already assigned as a proxy computing device 103. If, at step 606, the information manager 220 determines that the computing device 102 is already assigned as a proxy computing device 103, then the method 600 proceeds to step 608. Otherwise, the method 600 proceeds to step 614, which is described below in greater detail. At step 608, the information manager 220 issues, to a notification server 108—specifically, a notification manager 310 executing on the notification server 108—a request to assign the at least one nearby computing device 102 as a secondary computing device 102 to the proxy computing device 103. At step 610, the information manager 220 informs the at least one nearby computing device 102 of the assignment. In turn, at step 612, the information manager 220 updates a configuration to reflect the assignment, which, according to FIG. 2, can involve establishing adding an entry 232 within a channel 230 that corresponds to the at least one nearby computing device 102. In this manner, when the information manager 220 receives a push notification, the information manager 220 can utilize the channel 230 to properly forward respective push notifications to the at least one nearby computing device 102.

Turning now to FIG. 6B, at step 614, the information manager 220 establishes, between the computing device 102 and the at least one nearby computing device 102, an arbiter device for selecting the proxy computing device 103 based on fitness levels. At step 616, the information manager 220 establishes, based on a set of criteria, a fitness level of the computing device 102 to serve as the proxy computing device 103. At step 618, the information manager 220 determines whether the computing device 102 is the arbiter device. If, at step 618, the information manager 220 determines that the computing device 102 is the arbiter device, then the method 600 proceeds to step 620. Otherwise, the method 600 proceeds to step 626 of FIG. 4C, described in greater detail below. At step 620, the information manager 220 receives, from the at least one nearby computing device 102, a fitness level of the at least one nearby device computing device 102. At step 622, the information manager 220 selects, based on the fitness levels, either (1) the computing device 102, or (2) the at least one nearby computing device 102, to serve as the proxy computing device 103.

At step 624, the information manager 220 determines whether the computing device 102 is selected as the proxy computing device 103. If, at step 624, the information manager 220 determines that the computing device 102 is selected as the proxy computing device 103, then the method 600 proceeds back to step 608, which is described above in detail. Otherwise, the method 600 proceeds to step 630 of FIG. 6C. At step 630, the information manager 220 informs the at least one other computing device 102 that the at least one other computing device 102 is selected as the proxy computing device 103. At step 632, the information manager 220 updates a configuration (e.g., establishing a proxy computing device indication 229) to receive push notifications via the proxy computing device 103. This can also involve, for example, configuring the computing device 102 to eliminate the ability to receive push notifications directly from the notification servers 108, as the push notifications will now be received from the notification servers 108 via the proxy computing device 103.

Turning back now step 626, the information manager 220 provides, to the arbiter device, the fitness level of the computing device 102 to serve as the proxy computing device 103. At step 628, the information manager 220 receives, from the arbiter device, an indication of a particular computing device 102 chosen to serve as the proxy computing device 103. The method 600 then proceeds back to step 624 of FIG. 6B, described above in detail.

Although the method 600 generally involves the computing devices 102 being configured to select a proxy computing device 103 among themselves, it is noted that other embodiments can involve the computing devices 102 being configured to defer the selection decision to a notification manager 310 executing on a notification server 108. This can involve, for example, each computing device 102 that is eligible to serve as a proxy computing device 103 to indicate the eligibility to the notification manager 310. In turn, the notification manager 310 can appoint one of the computing devices 102 to serve as a proxy computing device 103. This decision can be communicated to the computing devices 102 according to a variety approaches, e.g., the notification manager 310 can inform only the selected computing device 102 of the decision (whereupon the selected computing device 102 informs the other computing devices 102 of the decision), the notification manager 310 can individually inform each of computing devices 102 of the decision, and the like. The secondary computing devices 102 can also be informed of the decision according to a variety of approaches, e.g., one or more of the computing devices 102 can communicate the decision to the secondary computing devices 102, the notification manager 310 can communicate the decision directly to the secondary computing devices 102, and the like.

Figure 7:
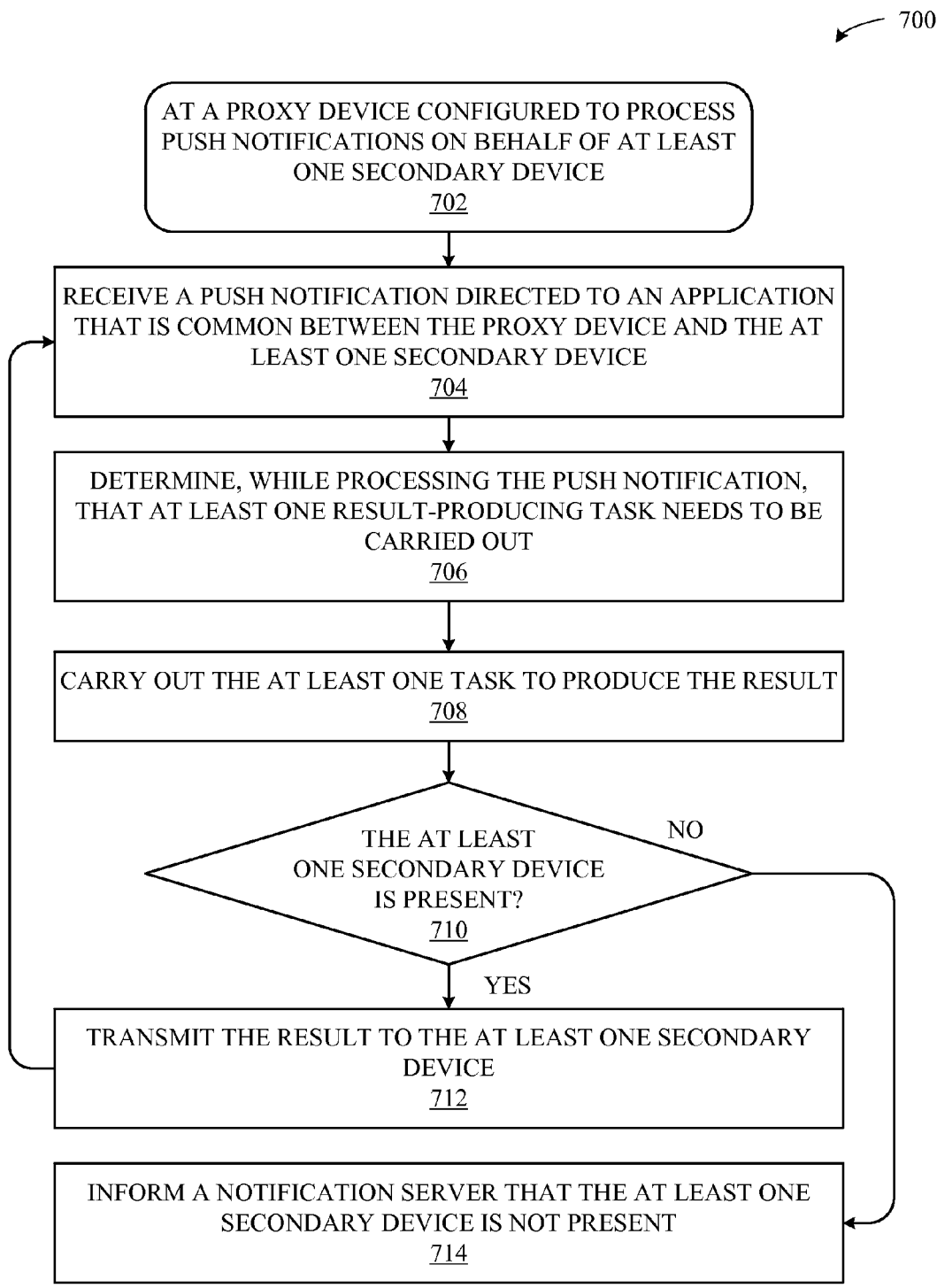
FIG. 7 illustrates a method that is carried out by an information manager executing on a computing device that is assigned as a proxy computing device, and involves processing push notifications on behalf of at least one secondary computing device, according to one embodiment.

FIG. 7 illustrates a method 700 that is carried out by an information manager 220 executing on a computing device 102 that is assigned as a proxy computing device 103, and involves processing push notifications on behalf of at least one secondary computing device 102, according to one embodiment. As shown in FIG. 7, the method 700 begins at step 702, where the information manager 220 is configured to process push notifications on behalf of at least one secondary computing device 102. At step 704, the information manager 220 receives a push notification directed to an application (e.g., a media sharing application) that is common between the proxy computing device 103 and the at least one secondary computing device 102. At step 706, the information manager 220 determines, while processing the push notification, that at least one result-producing task needs to be carried out in conjunction with processing the push notification. This can involve, for example, downloading a digital photo directly from a service provider 110, when the push notification itself does not include the digital photo, but instead includes only an indication that the digital photo is available for retrieval.

At step 708, the information manager 220 carries out the at least one task to produce the result (e.g., downloading the digital photo). At step 710, the information manager 220 determines whether the at least one secondary computing device 102 is present. If, at step 710, the information manager 220 determines that the at least one secondary computing device 102 is not present, then the method 700 proceeds to step 714, where the information manager 220 informs the notification server 108 that the at least one secondary computing device 102 is not present. In turn, the notification server 108 can attempt to directly deliver the push notification to the at least one secondary computing device 102.

Otherwise, if, at step 710, the information manager 220 determines that the at least one secondary computing device 102 is present, then the method 700 proceeds to step 712, where the information manager 220 transmits the result (e.g., the downloaded digital photo) to the at least one secondary computing device 102.

Figure 8:
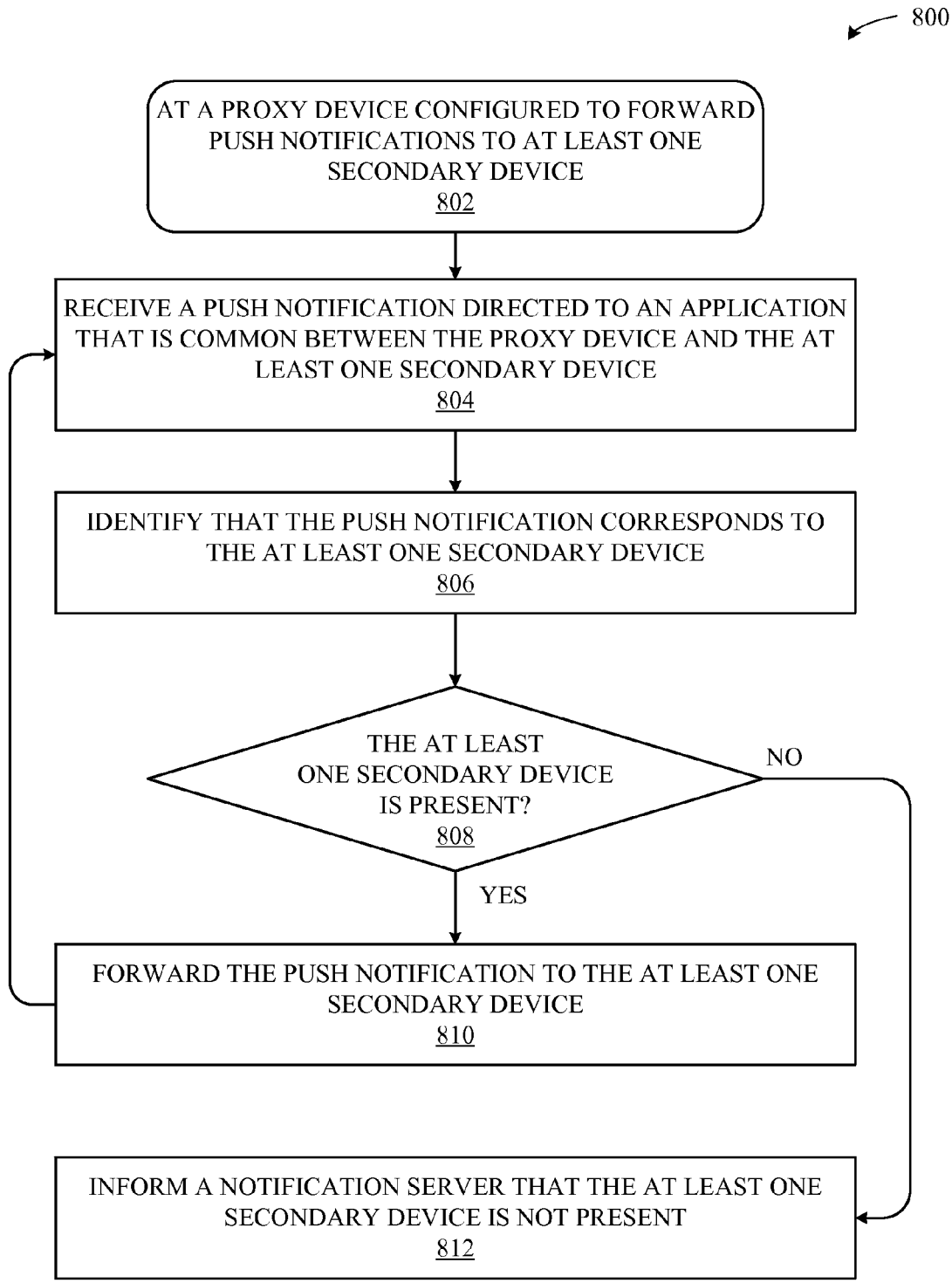
FIG. 8 illustrates a method that is carried out by an information manager executing on a computing device that is assigned as a proxy computing device, and involves forwarding push notifications to at least one secondary computing device, according to one embodiment.

FIG. 8 illustrates a method 800 that is carried out by an information manager 220 executing on a computing device 102 that is assigned as a proxy computing device 103, and involves forwarding push notifications to at least one secondary computing device 102, according to one embodiment. As shown, the method 800 begins at step 802, where the information manager 220 acts a proxy computing device 103 configured to forward push notifications to at least one secondary computing device 102. At step 804, the information manager 220 receives a push notification directed to an application that is common between the proxy computing device 103 and the at least one secondary computing device 102.

At step 806, the information manager 220 identifies that the push notification corresponds to the at least one secondary computing device 102. At step 808, the information manager 220 determines whether the at least one secondary computing device 102 is present. If, at step 808, the information manager 220 determines that the at least one secondary computing device is not present, then the method 800 proceeds to step 812, where the information manager 220 informs the notification server 108 that the at least one secondary computing device 102 is not present. In turn, the notification server 108 can attempt to directly deliver the push notification to the at least one secondary computing device 102.

Otherwise, if, at step 808, the information manager 220 determines that the at least one secondary computing device 102 is present, then the method 800 proceeds to step 810, where the information manager 220 forwards the push notification to the at least one secondary computing device 102.

Although the foregoing embodiments generally involve appointing a single proxy computing device 103 to serve as a proxy computing device 103, it is noted that other embodiments can involve configurations where two or more computing devices 102 are assigned to serve as proxy computing devices 103. This can be beneficial, for example, when the implementation of load balancing techniques can improve communication latencies and energy efficiency. Consider, for example, an example scenario where two or more computing devices 102 satisfy conditions to serve as a proxy computing device 103 (e.g., two fully charged tablet computing devices), and several computing devices 102 are seeking to become secondary computing devices 102. According to one embodiment, when two or more computing devices 102 are capable of serving as proxy computing devices 103 to secondary computing devices 102, the notification servers 108 can be configured to deliver, to the two or more proxy computing devices 103, communications associated with the secondary computing devices 102. In turn, the two or more proxy computing devices 103 can be configured to identify an efficient manner by which to deliver the communications to the secondary computing devices 102. According to another embodiment, when two or more computing devices 102 are capable of serving as proxy computing devices 103 to secondary computing devices 102, the notification servers 108 can be configured to selectively deliver, to particular ones of the two or more proxy computing devices 103, communications associated with the secondary computing devices 102. Using this approach, for example, the proxy computing devices 103 and/or the secondary computing devices 102 can be separated into groups in a manner that enables load balancing to be achieved. For example, a first proxy computing device 103 can be appointed to route communications to a first group of secondary computing devices 102, a second proxy computing device 103 can be appointed to route communications to a second group of secondary computing devices 102, and so on.

Figure 9:
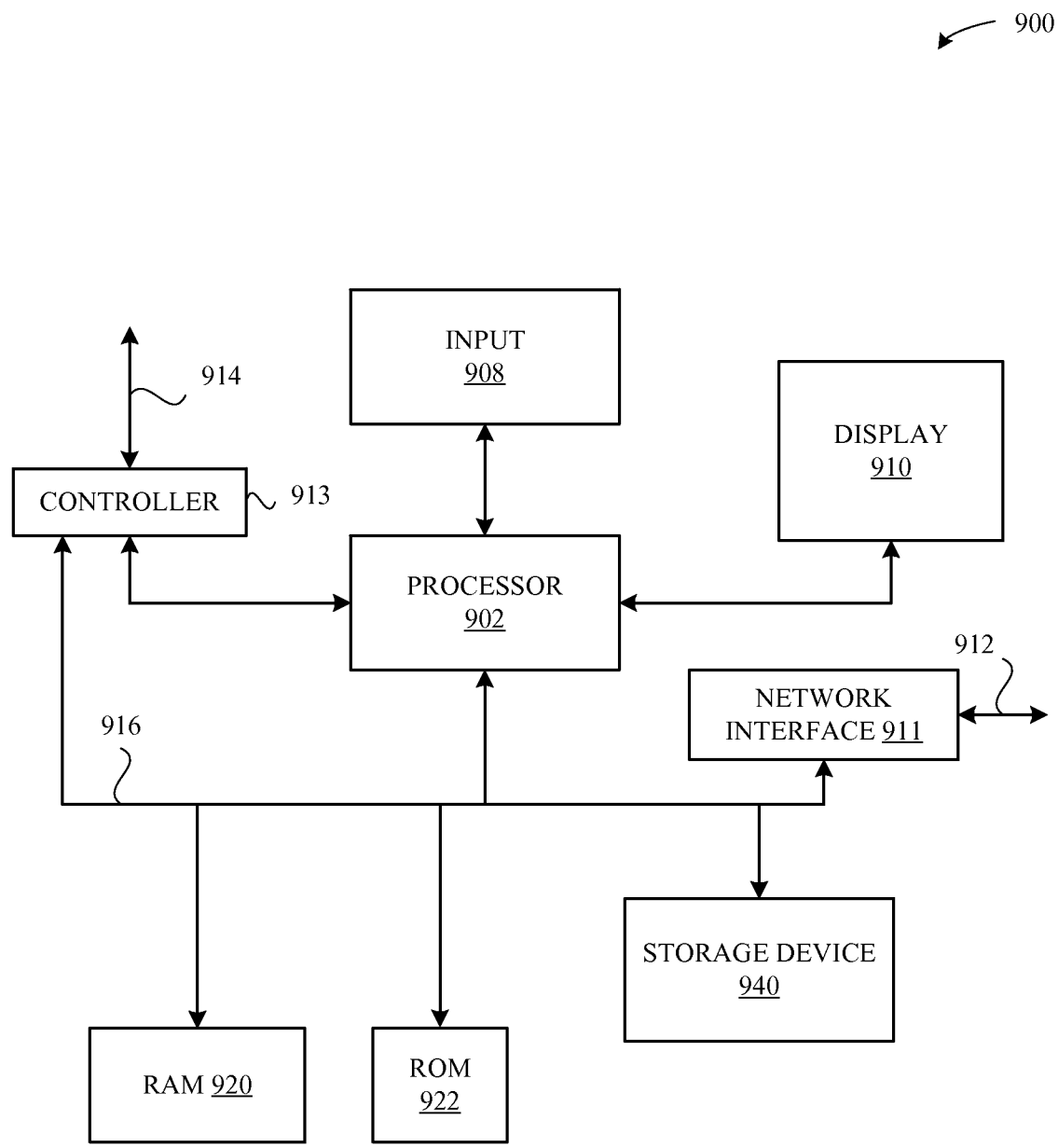
FIG. 9 illustrates a detailed view of a computing device that can be used to implement the various components described herein, according to some embodiments.

FIG. 9 illustrates a detailed view of a computing device 900 that can be used to implement the various components described herein, according to some embodiments. In particular, the detailed view illustrates various components that can be included in the computing devices 102 or the notification servers 108 illustrated in FIG. 1. As shown in FIG. 9, the computing device 900 can include a processor 902 that represents a microprocessor or controller for controlling the overall operation of computing device 900. The computing device 900 can also include a user input device 908 that allows a user of the computing device 900 to interact with the computing device 900. For example, the user input device 908 can take a variety of forms, such as a button, keypad, dial, touch screen, audio input interface, visual/image capture input interface, input in the form of sensor data, etc. Still further, the computing device 900 can include a display 910 (screen display) that can be controlled by the processor 902 to display information to the user. A data bus 916 can facilitate data transfer between at least a storage device 940, the processor 902, and a controller 913. The controller 913 can be used to interface with and control different equipment through and equipment control bus 914. The computing device 900 can also include a network/bus interface 911 that couples to a data link 912. In the case of a wireless connection, the network/bus interface 911 can include a wireless transceiver.

The computing device 900 also include a storage device 940, which can comprise a single disk or a plurality of disks (e.g., hard drives), and includes a storage management module that manages one or more partitions within the storage device 940. In some embodiments, the storage device 940 can include flash memory, semiconductor (solid state) memory or the like. The computing device 900 can also include a Random Access Memory (RAM) 920 and a Read-Only Memory (ROM) 922. The ROM 922 can store programs, utilities or processes to be executed in a non-volatile manner. The RAM 920 can provide volatile data storage, and stores instructions related to the operation of the computing device 900.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for enabling a computing device to offload communication tasks to a proxy computing device, the method comprising:
   at the computing device, wherein the computing device is a member of a personal area network (PAN):
      identifying a condition in which to seek out the proxy computing device to which the communication tasks can be offloaded;
      issuing, to nearby computing devices that are members of the PAN, a request for one of the nearby computing devices to serve as the proxy computing device;
      receiving, from at least one nearby computing device of the nearby computing devices, an offer to serve as the proxy computing device; and
      in response to receiving the offer:
         updating a configuration at the computing device to cause the computing device to offload the communication tasks to the proxy computing device.

2. The method of claim 1, wherein the communication tasks comprise push notifications, and updating the configuration further comprises:
   causing the computing device to receive push notifications via the proxy computing device instead of receiving the push notifications directly from a notification server.

3. The method of claim 1, wherein the communication tasks further comprise email fetch commands, and updating the configuration further comprises:
   causing the computing device to fetch emails from an email server only when the proxy computing device detects that the emails are available on the email server.

4. The method of claim 2, wherein identifying the condition in which to seek out the proxy computing device is based on at least one of the following factors: (i) a battery level of the computing device, (ii) the computing device is not plugged into a power adapter, (iii) a quality of internet connectivity available to the computing device, (iv) activity levels of one or more components included in the computing device, (v) whether the computing device successfully established a prior proxy connection at a current location of the computing device, and (vi) the computing device and the at least one nearby computing device are configured with a same user account known to the notification server.

5. The method of claim 2, further comprising:
   providing, to the at least one nearby computing device, an indication of an acceptance of the at least one nearby computing device to serve as the proxy computing device, wherein the indication includes a unique identifier (ID) that enables the at least one nearby computing device to:
      (i) receive, from the notification server, specific push notifications that are associated with the computing device, and
      (ii) route the specific push notifications to the computing device.

6. The method of claim 2, wherein the notification server selects the at least one nearby computing device to serve as the proxy computing device, but maintains, as a backup communications channel, an existing communication channel between the notification server and the computing device.

7. The method of claim 2, further comprising:
   issuing, to the notification server, an indication that the at least one nearby computing device is serving as the proxy computing device, wherein the indication causes the notification server to deliver, to the at least one nearby computing device, specific push notifications that are associated with the computing device.

8. The method of claim 7, wherein the indication is issued to the notification server by the proxy computing device.

9. The method of claim 2, further comprising:
   in response to identifying that the condition is no longer valid:
      issuing, to the at least one nearby computing device, a first indication that the at least one nearby computing device no longer needs to serve as the proxy computing device; and
      issuing, to the notification server, a second indication that the at least one nearby computing device is no longer serving as the proxy computing device, wherein the second indication causes the notification server to deliver, directly to the computing device, specific push notifications that are associated with the computing device.

10. The method of claim 2, further comprising:
    receiving, from the at least one nearby computing device, a first indication that the at least one nearby computing device is no longer willing to serve as the proxy computing device; and
    issuing, to the notification server, a second indication that the at least one nearby computing device is no longer serving as the proxy computing device, wherein the second indication causes the notification server to deliver, directly to the computing device, specific push notifications that are associated with the computing device.

11. The method of claim 10, wherein the second indication is issued to the notification server by the proxy computing device.

12. The method of claim 2, wherein the request is issued to the nearby computing devices using a first type of low-energy communication protocol, and the push notifications are received from the at least one nearby computing device using a second type of low-energy communication protocol.

13. The method of claim 2, further comprising:
    for each push notification received by the proxy computing device and directed to the computing device:
       constructing a communication channel with the proxy computing device;

receiving the push notification via the communication channel; and deconstructing the communication channel.

14. The method of claim 13, wherein, for each push notification received by the proxy computing device and directed to the computing device, the communication channel is based on at least one of a size of the push notification, a priority of the push notification, and a proximity of the proxy computing device to the computing device.

15. A method for enabling a computing device to serve as a proxy computing device to at least one nearby computing device, the method comprising:

at the computing device, wherein the computing device is a member of a personal area network (PAN):
receiving, from the at least one nearby computing device, a request for the computing device to serve as the proxy computing device, wherein the at least one nearby computing device is a member of the PAN;
identifying a condition in which the computing device is eligible to serve as the proxy computing device to the at least one nearby computing device;
in response to identifying the condition, issuing, to the at least one nearby computing device, an offer to serve as the proxy computing device; and
updating, at the computing device, a configuration to cause the computing device to:
(i) receive, from a notification server, specific push notifications associated with the at least one nearby computing device, and
(ii) route the specific push notifications to the at least one nearby computing device.

16. The method of claim 15, wherein identifying the condition is based on at least one of the following factors: (i) a battery level of the computing device, (ii) the computing device is plugged into a power adapter, (iii) a quality of internet connectivity available to the computing device, and (iv) activity levels of one or more components included in the computing device.

17. The method of claim 15, further comprising:
receiving, from the at least one nearby computing device, an indication of an acceptance of the offer, wherein the indication includes a unique identifier (ID) that enables the computing device to properly route the specific push notifications to the at least one nearby computing device.

18. The method of claim 15, further comprising:
issuing, to the notification server, an indication that the computing device is serving as the proxy computing device to the at least one nearby computing device, wherein the indication causes the notification server to deliver, to the computing device, specific push notifications that are associated with the at least one nearby computing device.

19. The method of claim 15, further comprising:
in response to identifying that the condition is no longer valid:
issuing, to the at least one nearby computing device, a first indication that the computing device is no longer willing to serve as the proxy computing device; and
issuing, to the notification server, a second indication that the computing device is no longer serving as the proxy computing device, wherein the second indication causes the notification server to deliver, directly to the at least one nearby computing device, specific push notifications that are associated with the at least one nearby computing device.

20. The method of claim 19, wherein identifying that the condition is no longer valid is further based on at least one of the following factors: determining that a connection through which the specific push notifications are delivered to the at least one nearby computing device is no longer active.

21. A system configured to enable a computing device to serve as a proxy computing device to at least one nearby computing device, comprising:
at least two computing devices, wherein the at least two computing devices are members of a personal area network (PAN); and
a notification server, wherein the notification server is configured to carry out steps that include:
receiving, from a first computing device of the at least two computing devices, an indication that the first computing device is serving as a proxy computing device to a second computing device of the at least two computing devices; and
updating a configuration to cause specific push notifications directed toward (i) the first computing device, or (ii) the second computing device, to be delivered to the first computing device.

22. The system of claim 21, wherein the system further comprises a services provider, and the notification server is configured to interface with the services provider and generate push notifications based on interactions with the services provider.

23. The system of claim 22, wherein the notification server is further configured to carry out steps that include:
receiving, from the services provider, a request to generate a push notification that is specific to the second computing device; and
in response to the request, and in accordance with the configuration:
delivering the push notification to the first computing device, wherein the first computing device forwards the push notification to the second computing device.

24. The system of claim 23, wherein the notification server is further configured to incorporate, into the push notification, information that identifies the second computing device.

25. The system of claim 23, wherein the notification server is further configured to carry out steps that include:
detecting that the push notification is not delivered to the second computing device; and
in response to detecting:
updating the configuration to cause (i) specific push notifications directed toward the first computing device to be delivered directly to the first computing device, and (ii) specific push notifications directed toward the second computing device to be delivered directly to the second computing device.

26. The system of claim 25, wherein detecting that the push notification is not delivered to the second computing device comprises:
receiving, from the first computing device, an indication that the first computing device is not able to communicate with the second computing device; or
detecting that the first computing device does not receive the push notification.

27. A method for offloading a subset of tasks from an application processor (AP) to a communications component, the method comprising:
at a mobile device, wherein the mobile device includes the AP and the communications component:

identifying a condition in which to offload the subset of tasks from the AP to at least one communications component; and updating a configuration within the mobile device to:
- cause the AP to offload the subset of the tasks to the at least one communications component, and
- cause the at least one communications component to assume the responsibility of carrying out the subset of the tasks on behalf of the AP.

28. The method of claim 27, wherein the subset of tasks includes keepalive (KA) commands that cause a communications channel between the mobile device and a notification server to remain active, and updating the configuration causes the at least one communications component to issue the KA commands to the notification server.

29. The method of claim 28, wherein the subset of tasks includes email fetch commands, and updating the configuration causes the at least one communications component to reduce an amount by which the AP is configured to transition from an inactive state to an active state, by carrying out steps that include:
- issuing email fetch commands, and
- causing the AP to transition to the active state when at least one new email is available for download.

30. The method of claim 28, wherein updating the configuration causes the at least one communications component to:
- receive push notifications,
- buffer each push notification having a low-priority, and
- when an interval of time lapses:
  - provide the buffered low-priority push notifications to the AP for subsequent processing.

31. The method of claim 27, wherein the at least one communications component is selected in accordance with a type of the subset of tasks.

32. The method of claim 27, wherein, when the subset of tasks involves providing coarse-granularity location updates to a cloud service, the at least one communications component comprises a cellular component.

33. The method of claim 27, wherein, when the subset of tasks involves providing fine-granularity location updates to a cloud service, the at least one communications component comprises a cellular component and a Global Positioning System (GPS) component.

34. The method of claim 27, wherein, when the subset of tasks involves providing indoor location updates to a cloud service, the at least one communications component comprises a cellular component and a WiFi component.

35. The method of claim 27, wherein, when the subset of tasks involves communicating with nearby devices via a low-energy protocol, the at least one communications component comprises a cellular component and a Bluetooth® component.

* * * * *